Oct. 3, 1961          J. LEWIS          3,002,646
PLURAL WALLED CONTAINER AND PROCESS OF MANUFACTURING THEREOF
Filed Aug. 22, 1960
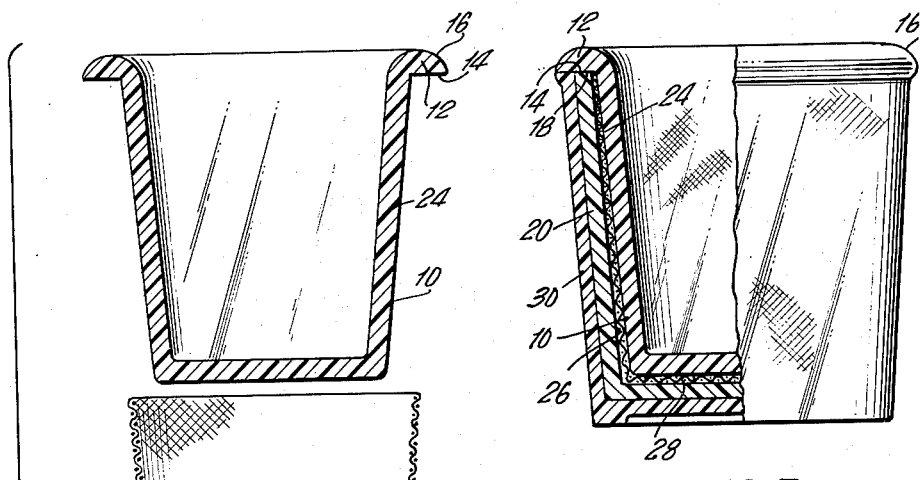
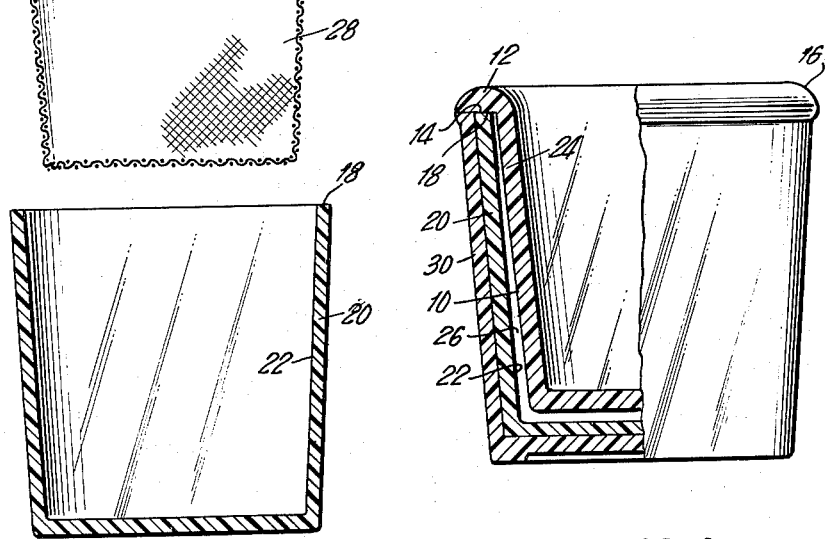
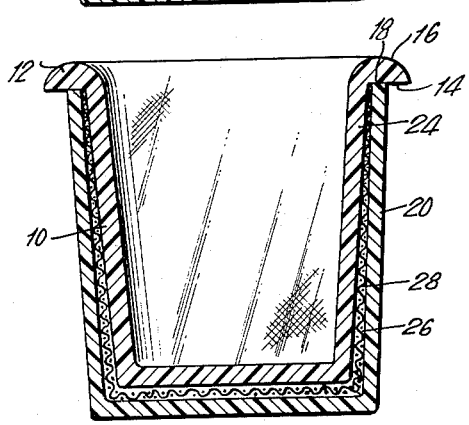
FIG.1
FIG.2
FIG.3
FIG.4
INVENTOR.
JEROME LEWIS
BY
ATTORNEY United States Patent Office 3,002,646
Patented Oct. 3, 1961

3,002,646
PLURAL WALLED CONTAINER AND PROCESS
OF MANUFACTURING THEREOF
Jerome Lewis, 230 5th Ave., New York, N.Y.
Filed Aug. 22, 1960, Ser. No. 51,087
1 Claim. (Cl. 220—9)

This invention relates to a plural walled container and to a novel process of manufacturing this type of container.

In the past, thermoplastic material has been employed for molding or otherwise fabricating double walled containers. When transparent materials such as Lucite, polystyrene or the like are employed, seals of an adhesive material have been employed to effect the closures between the inner and outer receptacles of the double walled container which gives rise to a crazed or otherwise disfiguring appearance to the double walled containers, and it is an object of the present invention to fabricate a plural walled container which will enable various transparent synthetic materials to be employed and wherein a more attractive finished product can be attained.

Various types of double walled containers having seals between the inner and outer receptacles which employ adhesive material have been found to be unsatisfactory because after use and subsequent washing, minor cracks in the seals often result, especially if these thermoplastic containers are washed in a dish washer which results in washing fluid entering the space between the inner and outer receptacles rendering the container unsatisfactory for further use.

It is therefore another object of the present invention to fabricate a plural walled container which is provided with means which prevent the penetration of fluid into the space between the inner and outer receptacles except upon actual cracking of the container structure itself and which further results in a much stronger container.

In carrying out the invention, a new departure from the art of making double walled plastic containers is employed which includes the application of a third wall molded about the previously arranged inner and outer receptacles so as to provide a unitary molded construction.

Still further objects and features of the invention reside in the provision of a plural walled container that is simple to fabricate, capable of being molded out of readily available materials into various types of containers such as dishes, pitchers, tumblers, milk and cocktail shakers, cups, plates or trays, urns, pots, and such other configurations which may be desired and which allows for use in the home and factory, and which is especially adapted for shipboard use since the containers are substantially indestructible and will not crack or break upon falling, and which containers are ideal for use in aircraft since they are extremely light in weight and insulate hot or cold eatables or beverages, rendering the container safe to grasp should there be sudden motion of the aircraft.

These, together with the various ancillary objects and features of the invention which will become apparent as the following description proceeds, are attained by this plural walled container and process of manufacturing thereof, preferred embodiments of the container being shown in the accompanying drawing, by way of example only, wherein:

FIG. 1 is an exploded sectional view of the various components of the plural walled container;

FIG. 2 is a sectional detail view of the invention in an intermediate stage of manufacture;

FIG. 3 is an elevational view with parts being shown in section of a container employing a decorative and/or insulative insert; and FIG. 4 is a view similar to that of FIG. 2 but illustrating a modified form of the invention in which no insert is provided.

With continuing reference to the accompanying drawing wherein like reference numerals are used to designate similar parts throughout the several views, reference numeral 10 generally designates an inner receptacle of a thermoplastic material such as Lucite, polystyrene, polyvinylchloride or the like of any suitable shape so as to form part of a plural walled dish, pitcher, tumbler, shaker, plate, urn, pot, cup or the like and is provided with an upper overhang portion 12 having on the underside 14 thereof a substantially horizontal surface and being provided with a rounded side and upper surface 16.

The inner receptacle 10 is preferably of a tapered shape for conveniently molding such structure and is of a comparatively thin wall construction, the thickness of the wall being exaggerated in the drawing for the sake of clarity.

The bottom edge of the overhang 14 is adapted to provide a substantially fluid-tight fit with the edge 18 of an outer receptacle 20 formed of an identical substance to that of the receptacle 10. The outer receptacle 20 has its inner wall 22 of slightly larger dimensions than the dimensions of the outer wall 24 of the inner receptacle 10, so as to form a space therebetween, as seen at 26.

This air space 26 is a closed air space, and thus, provides very satisfactory insulation for the inner receptacle 10 and the contents of the inner receptacle 10. An insert 28 of woven fabric, paper, plastic, or strip material such as rattan, cane, or woven cloth, lace, or the like may be inserted for further insulation and for decoration into the space 26 between the inner and outer receptacles prior to the assembly thereof.

It is to be recognized that the inner receptacle 10, the outer receptacle 20, or both may be made transparent, as desired, so that the insert 28 can be readily perceived for its decorative result, as may be desired.

After the parts have been assembled to the stage shown in FIG. 2, the assembled inner and outer receptacles with the insert 28 disposed therebetween are placed in a mold, whereby a layer of additional material identical with that of the material from which both the inner receptacle 10 and outer receptacle 20 are formed, is then molded about the receptacles. Such additional material of a thermoplastic nature is indicated at 30 and unites integrally with the material of the outer receptacle 20 and with the overhang portion 12 of the inner receptacle 10 with the material flowing into and becoming unitary with the material of the overhang portion, so that there is no joint or seal formed but a monolithic construction. The layer has a lip portion cooperating with said overhang portion 12 to define an integral arcuate lip outwardly disposed of the rest of said container.

Because of the fact that the edge 18 engages the edge 14, such will remain in airtight contact with each other without a separate seal and no crazing or distortion will be apparent.

In FIG. 4 there is shown an arrangement of parts where the insert 26 is not employed, this being very feasible when both the inner receptacle 10 and outer receptacle 20 are transparent or both opaque.

Thus it can be seen that there has been defined a process of manufacturing a plural walled container, which comprises the steps of arranging an inner receptacle 10 within an outer receptacle 20, then placing the arranged receptacles in a mold, so that a thermoplastic material can be molded about the receptacles with the plastic material fusing with the receptacles, so that there is produced a plural walled container having an inner receptacle 10, an outer receptacle 20 and a third wall 30 formed of plastic material fused to both the outer receptacle 20 and the overhang portion 12 of the inner receptacle 10.

Since from the foregoing the construction and advantages, as well as the method steps of this invention become readily apparent, further description is believed to be unnecessary.

Since numerous modifications and equivalents will readily occur to those skilled in the art, it is not intended to limit the invention to the precise embodiment shown and described, but all suitable modifications and equivalents may be readily resorted to which fall within the scope of the appended claim.

Having thus described the invention, what is claimed as new and desired to be secured by Letters Patent, is:

A plural walled container comprising an inner receptacle and an outer receptacle, said inner and outer receptacles being of a thermoplastic material, said inner receptacle having a flange portion overlying and extending beyond the outer surface of said outer receptacle and being disposed within said outer receptacle in spaced relationship for substantially the entire opposed surfaces thereof and with only the upper edge of said outer receptacle engaging the under face of said flange portion of said inner receptacle at a side location spaced from the top of said inner receptacle defining a closed insulation space between said inner and outer receptacles, and a layer of a thermoplastic material integrally fused with the outer surface of said outer receptacle and integrally fused with the under face of said flange portion of said inner receptacle at said side location, said layer completely surrounding the outer surface of said outer receptacle, said layer having a lip portion cooperating with said flange portion defining an integral arcuate lip outwardly disposed of the rest of said container.

References Cited in the file of this patent

UNITED STATES PATENTS

| | | |
|---|---|---|
| 1,672,904 | Randall | June 12, 1928 |
| 2,315,803 | Lipari | Apr. 6, 1943 |
| 2,339,221 | Gulick | Jan. 11, 1944 |
| 2,546,208 | Barton | Mar. 27, 1951 |
| 2,637,182 | Davis | May 5, 1953 |
| 2,715,326 | Gits | Aug. 16, 1955 |
| 2,725,733 | Davis | Dec. 6, 1955 |
| 2,899,098 | Gits | Aug. 11, 1959 |
| 2,945,266 | Mainardi | July 19, 1960 |

FOREIGN PATENTS

| | | |
|---|---|---|
| 488,767 | Canada | Dec. 9, 1952 |